(12) United States Patent
Schott et al.

(10) Patent No.: US 8,133,017 B2
(45) Date of Patent: Mar. 13, 2012

(54) COMPRESSOR DIFFUSER

(75) Inventors: Carl Gerard Schott, Simpsonville, SC (US); Stanley Kevin Widener, Greenville, SC (US); Anil Salunkhe, Greer, SC (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 12/407,525

(22) Filed: Mar. 19, 2009

(65) Prior Publication Data

US 2010/0239418 A1    Sep. 23, 2010

(51) Int. Cl.
*F01D 25/30* (2006.01)
(52) U.S. Cl. ........................................... 415/207
(58) Field of Classification Search ................. 415/207, 415/142, 191, 208.1, 208.2, 209.3, 209.4, 415/210.1; 60/751, 752, 746
See application file for complete search history.

(56) References Cited

U.S. PATENT DOCUMENTS

| | | | |
|---|---|---|---|
| 2,556,161 A * | 6/1951 | Bailey et al. ................ | 60/751 |
| 3,877,360 A | 4/1975 | Vigerstrom | |
| 4,208,718 A | 6/1980 | Chung | |
| 4,349,314 A | 9/1982 | Erwin | |
| 4,458,479 A | 7/1984 | Reider et al. | |
| 4,459,802 A | 7/1984 | Mowill | |
| 4,503,668 A | 3/1985 | Duncan, III et al. | |
| 4,544,325 A | 10/1985 | Rogo et al. | |
| 4,718,819 A | 1/1988 | Rogo et al. | |
| 4,961,309 A | 10/1990 | Liebl | |
| 5,592,821 A | 1/1997 | Alary et al. | |
| 5,619,855 A | 4/1997 | Burrus | |
| 5,839,283 A | 11/1998 | Dobbeling | |
| 6,210,104 B1 | 4/2001 | Schonenborn | |
| 6,513,330 B1 * | 2/2003 | Rice et al. ................ | 60/751 |
| 6,554,569 B2 | 4/2003 | Decker et al. | |
| 6,699,008 B2 | 3/2004 | Japikse | |
| 6,843,059 B2 | 1/2005 | Burrus et al. | |
| 7,101,151 B2 | 9/2006 | Loringer et al. | |
| 2007/0175220 A1 | 8/2007 | Bland | |
| 2007/0271923 A1 | 11/2007 | Dawson | |

* cited by examiner

*Primary Examiner* — Alexander Gilman
(74) *Attorney, Agent, or Firm* — Cantor Colburn LLP

(57) ABSTRACT

A diffuser for a turbine engine, including an annular casing to seal compressor discharge air and struts attached to the casing to delimit an annular array of intra-strut regions, is provided and includes a ring portion, including a ring shaped annular body with a forward face disposed on a forward side thereof, the ring portion being supportable by one or more of the struts, and a splitter portion, including a ring shaped annular body with an aft face disposed on an aft side thereof to mate with the forward face of the ring portion body, the splitter portion further including a lead edge, on a forward side of the splitter portion body, which is extendable into a flow path of the compressor discharge air to split the flow path into secondary flow paths defined radially outside of and inside of the splitter portion body.

20 Claims, 6 Drawing Sheets

COMPRESSOR DIFFUSER

BACKGROUND OF THE INVENTION

The subject matter disclosed herein relates to gas turbine compressor diffusers and, more particularly, to compressor diffusers with combustor supports.

Current engine and rig test data on existing gas turbines shows that flow energy losses within a compressor discharge case (CDC) at an axial location downstream from the compressor diffuser are an important factor in gas turbine efficiency and output. For new engine designs, traditional controls and apparatuses for mitigating these losses have been found to add length to the CDC. Unfortunately, these controls increase a complexity of the mechanical design of the gas turbine, as a whole, and add product costs to the gas turbine.

In addition, these controls and apparatuses may be combined with the use of multi-passage diffusers. However, the use of such multi-passage diffusers requires extensive casting and machining operations that also add to the overall product costs.

BRIEF DESCRIPTION OF THE INVENTION

According to one aspect of the invention, a diffuser for a turbine engine, including an annular casing to seal compressor discharge air and struts attached to the casing to delimit an annular array of intra-strut regions, is provided and includes a ring portion, including a ring shaped annular body with a forward face disposed on a forward side thereof, the ring portion being supportable by one or more of the struts, and a splitter portion, including a ring shaped annular body with an aft face disposed on an aft side thereof to mate with the forward face of the ring portion body, the splitter portion further including a lead edge, on a forward side of the splitter portion body, which is extendable into a flow path of the compressor discharge air to split the flow path into secondary flow paths defined radially outside of and inside of the splitter portion body.

According to another aspect of the invention, a diffuser for a turbine engine, including an annular casing to seal compressor discharge air and struts attached to the casing to delimit an annular array of intra-strut regions, is provided and includes a ring shaped annular body, which is supportable at an aft side thereof by one or more of the struts, the ring shaped annular body including a lead edge, on a forward side thereof, which is extendable into a flow path of the compressor discharge air to split the flow path into secondary flow paths defined radially outside of and inside of the ring shaped annular body and the lead edge.

According to yet another aspect of the invention, a diffuser for a turbine engine, including an annular casing to seal compressor discharge air and struts attached to the casing to delimit an annular array of intra-strut regions, is provided and includes a ring shaped annular body, supportable at an aft side thereof by one or more of the struts, and including a lead edge, on a forward side of the annular body, which is extendable into a flow path of the compressor discharge air to split the flow path into secondary flow paths defined radially outside of and inside of the ring shaped annular body and the lead edge, and a supporting assembly, disposed on the ring shaped annular body within an intra-strut region, and on which a combustor assembly is supportable.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

With reference to FIGS. 1-6, a diffuser 10 is provided for use in a turbine engine 1. The turbine engine 1 may include a rotor that rotates about a centerline thereof, a compressor section upstream of the diffuser 10, which compresses inlet air and discharges hot compressor discharge air, an annular compressor discharge casing (CDC) 20, which seals the compressor discharge air from the rotor and a set of struts 30, and which includes wall surfaces 21 and 22 that delimit a region through which the hot compressor discharge air is able to flow.

Figure 1:
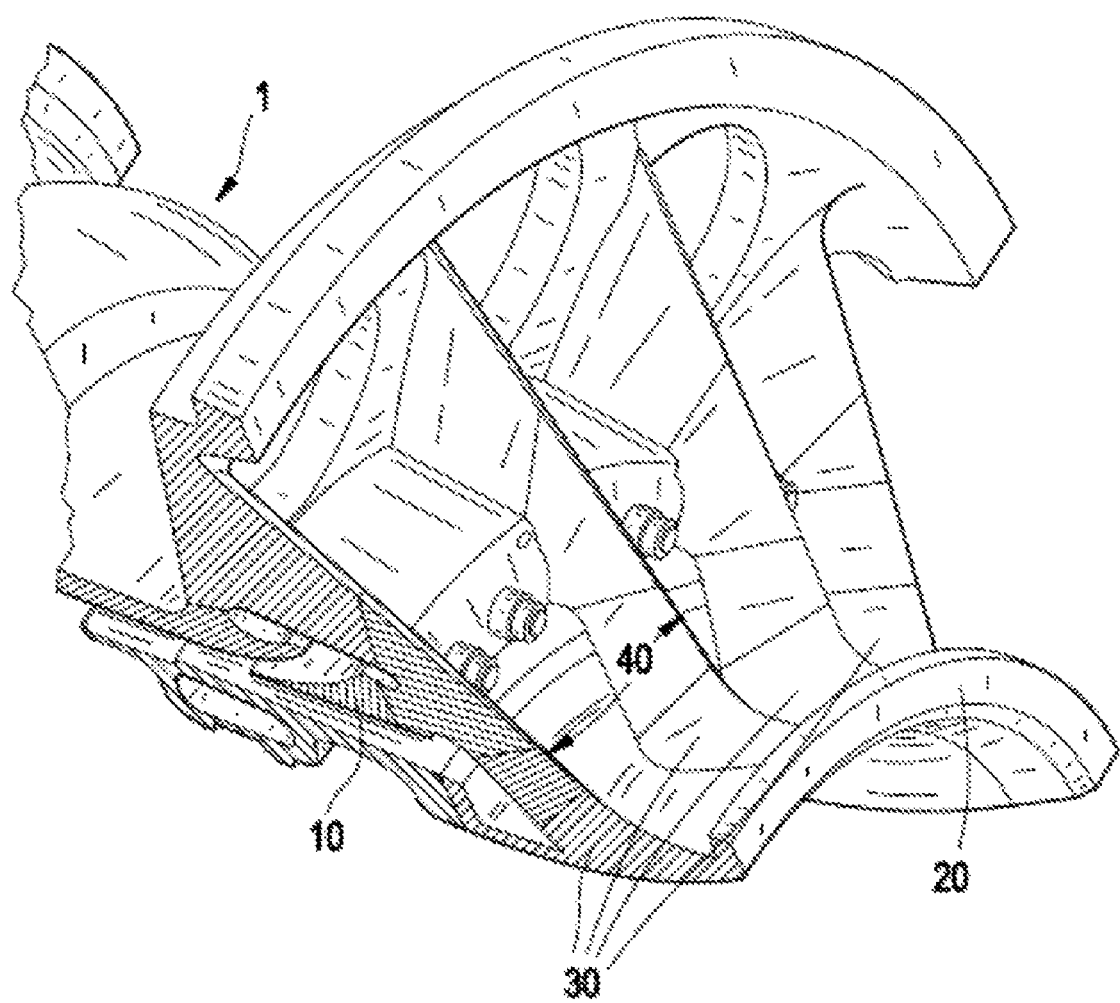
FIG. 1 is a rear perspective view of a compressor discharge casing and a diffuser in accordance with embodiments.
Figure 2:
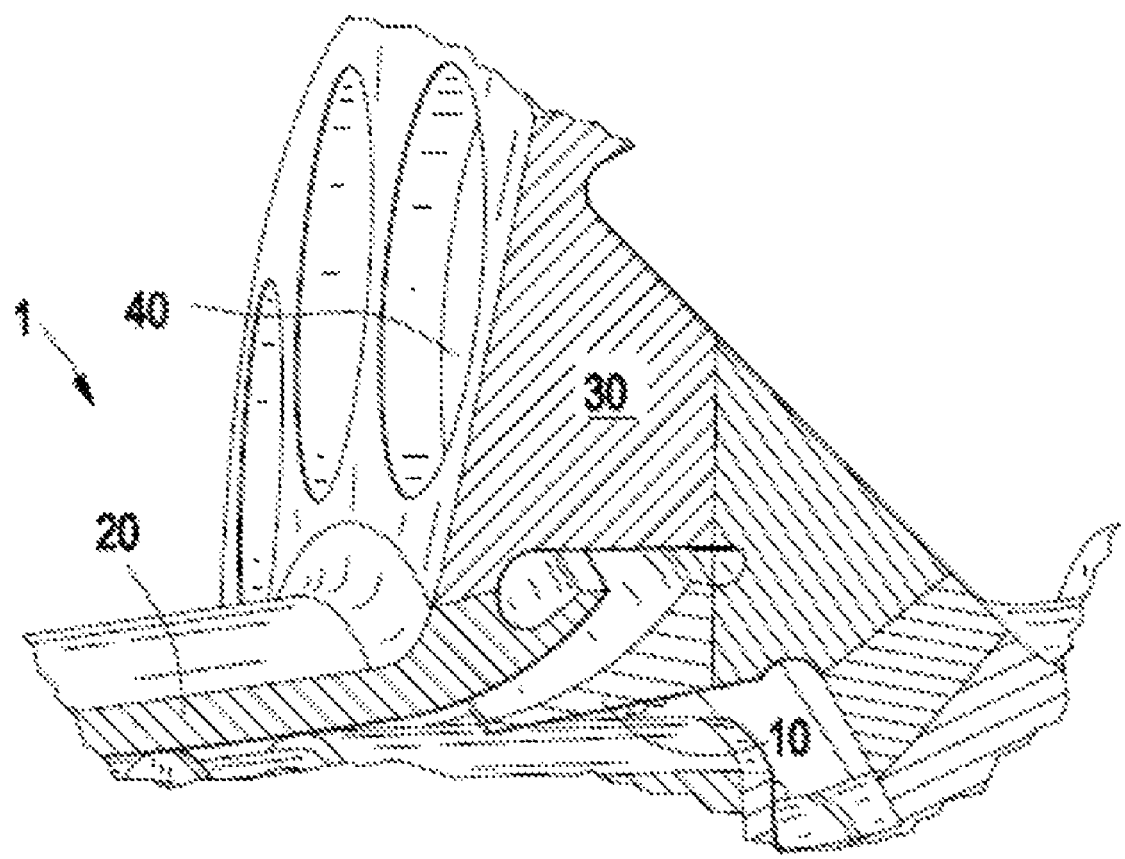
FIG. 2 is forward perspective view of a compressor discharge casing and a diffuser in accordance with embodiments.

With reference to FIGS. 1 and 2, each of the struts 30 includes opposing forward and aft ends. The ends are each attached to the CDC 20 such that each of the struts 30 is substantially aligned with a longitudinal axis of the rotor and with the struts disposed at substantially regularly spaced circumferential locations. In this way, the struts 30 delimit an annular array of intra-strut regions 40. A can-annular array of combustor assemblies 110, which are receptive of the compressor discharge air for combustion operations, may be supported on portions of the diffuser 10 in these intra-strut regions 40, as will be described below.

Figure 3:
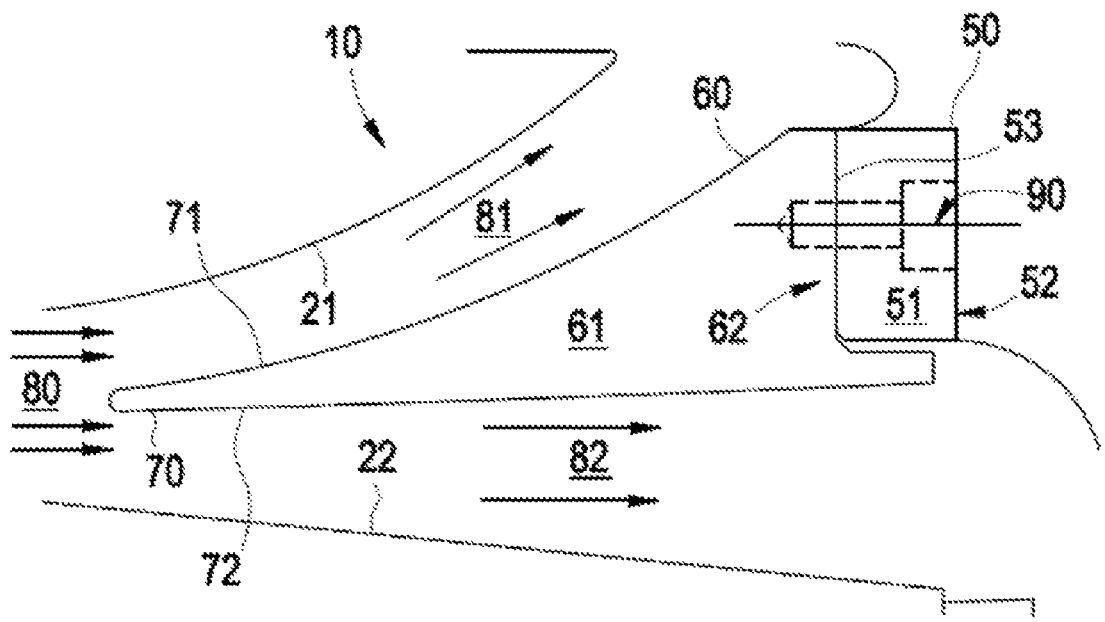
FIG. 3 is a side sectional view of the diffuser annular body of FIGS. 1 and 2.

With reference to FIG. 3, the diffuser 10 includes the wall surfaces 21 and 22, a ring portion 50 and a splitter portion 60. The ring portion 50 includes a ring shaped annular body 51 and forward and aft faces 53 and 52, which are disposed on opposing forward and aft facing sides of the annular body 51, respectively. The ring portion 50 is supportable by one or more of the struts 30. Support for the ring portion 50 may be generally provided by way of a connection between the strut 30 and the aft face 52, although other components of the ring portion 50 may also have connections to the strut 30.

Figure 4:
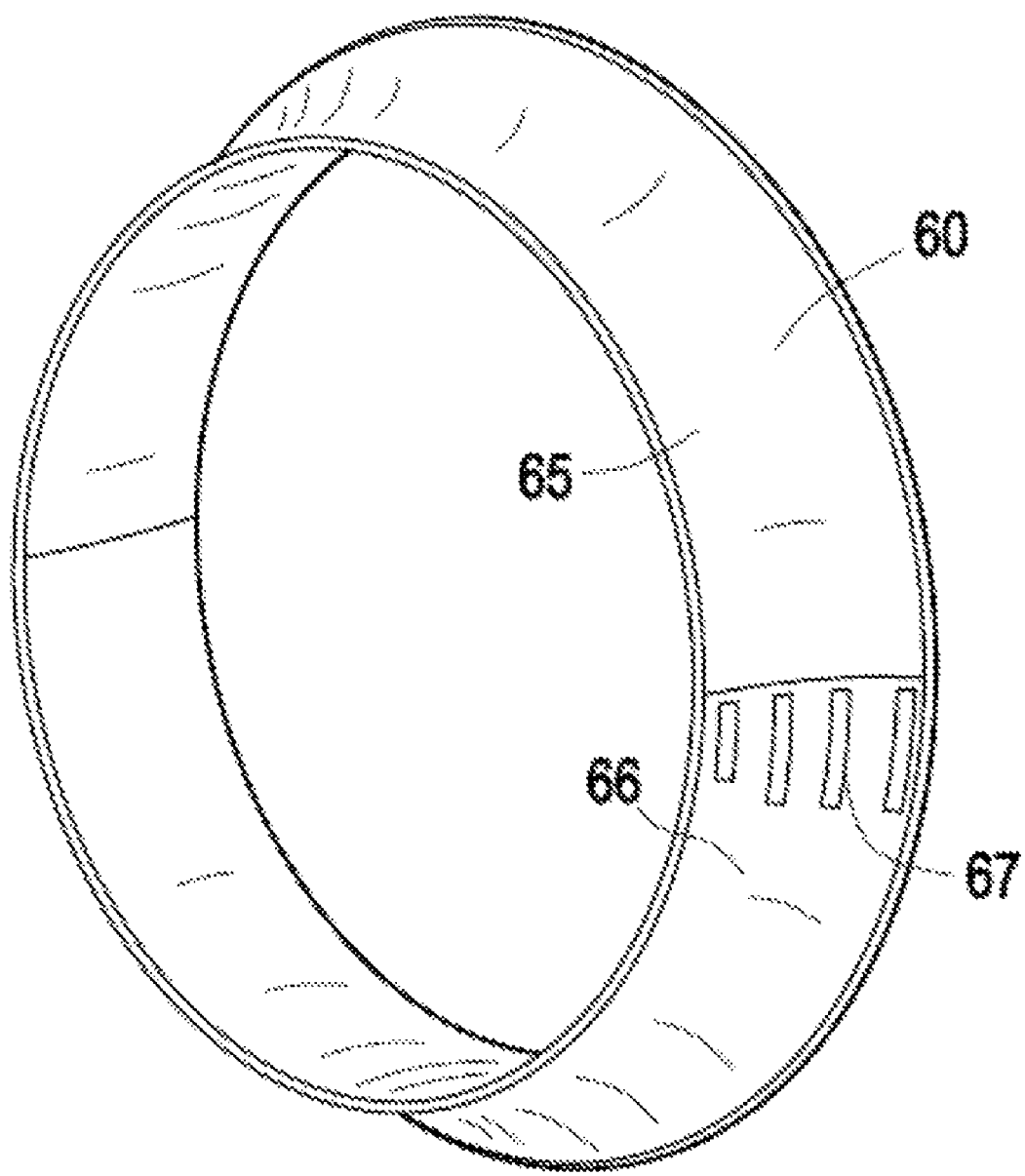
FIG. 4 is a perspective view of a splitter portion of the diffuser of FIGS. 1-3.

With reference to FIG. 4, the splitter portion 60 includes a ring shaped annular body 61 and an aft face 62, which is disposed on an aft surface of the splitter portion body 61. The aft face 62 of the splitter portion 60 may be mated with the forward face 53 of the ring portion such that the ring and splitter portions 50 and 60 cooperatively form a singular ring-shaped structure.

The splitter portion 60 further includes a lead edge 70. The lead edge 70 is formed at an intersection of first and second forward faces 71 and 72 of the splitter portion body 61. The faces 71 and 72 are tapered toward one another in the upstream flow direction. With the ring portion 50 supported by the struts 30, the lead edge 70 is extendable into a flow path 80 of the compressor discharge air. The diffuser 10 is thereby configured to split the flow path 80 into secondary flow paths 81 and 82, which are defined radially outside of and inside of the diffuser 10 and between faces 71 and 72 and wall surfaces 21 and 22, respectively. That is, the secondary flow paths 81 and 82 are at least initially radially divergent while they may terminate downstream at combustor assemblies 110 to be described below.

The diffuser 10 may be provided as a single component or as multiple diffusers 10 that are each structured substantially as described above. Where the diffuser 10 is provided as multiple diffusers 10, each individual diffuser 10 is independently supported on at least one individual strut 30. Of course, it is to be understood that still other configurations for the diffuser 10 are possible and that, for example, each individual diffuser 10 may be supported on two or more struts 30. Where the diffuser 10 is formed of multiple components, such as upper portion 65 and lower portion 66, the components may be conjoined by bolts 67 at joint(s) therein. Seals or baffles to prevent or control air leakage between the components may also be employed.

The ring portion 50 is integrally coupled to the struts 30. That is, the ring portion 50 may be cast or otherwise suitably formed along with the struts 30 and the CDC 20. The splitter portion 60, on the other hand, may be formed by a separate machining process and later mated with the ring portion 50. As such, the faces 71 and 72, which are to be substantially smooth, can be machined with a high degree of precision. With this said, it is understood that the splitter portion 60 may be formed integrally with the ring portion 50, the struts 30 and the CDC 20 as long as processing tolerances can be maintained with a high degree of precision, and as long as mechanical stresses are acceptable. Once the splitter portion 60 and the ring portion 50 are formed, the splitter portion 60 is coupled to the ring portion 50. Mechanical connectors, such as axial bolts 90 or some other type of suitable fastening element, may serve to provide for this coupling.

Figure 5:
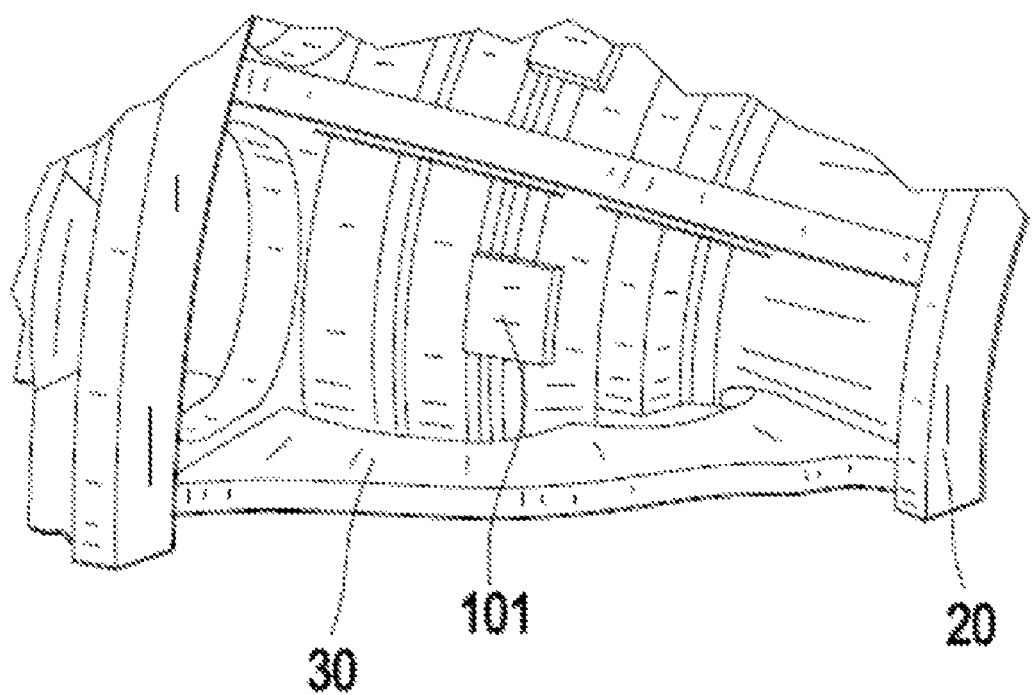
FIG. 5 is a rear perspective view of a compressor discharge casing, a diffuser and supporting assemblies in accordance with embodiments.

With reference to FIG. 5, the diffuser 10, with the construction described above, is supported on one or more of the struts 30 and splits the flow path 80 of the compressor discharge air. In an additional configuration, combustor assemblies 110 are supported by at least one of the ring portion 50 and the splitter portion 60 of the diffuser 10 in a can-annular array of combustor assemblies 110. Here, each individual combustor assembly 110 is supported on a radially outward portion of at least one of the ring portion 50 and the splitter portion 60 and within an intra-strut region 40.

Figure 6:
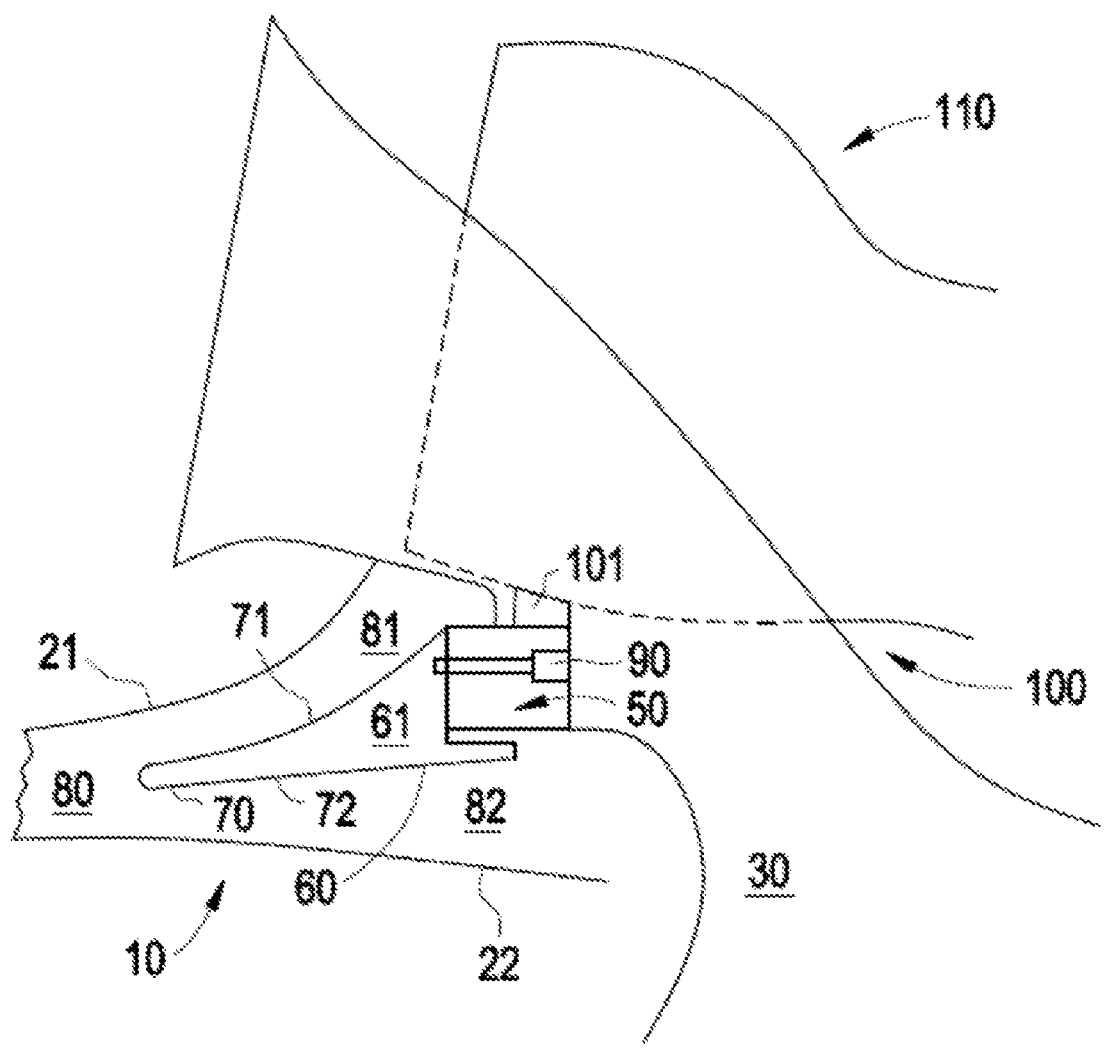
FIG. 6 is a side sectional view of a compressor discharge casing, a diffuser and a combustor assembly supported on the diffuser in accordance with embodiments.

With reference to FIG. 6, a supporting assembly 100 provides for the support of each combustor assembly 110. The supporting assembly 100 includes a pad 101 and a bracket 102. The pad 101 is coupled to at least one of the ring portion 50 and the splitter portion 60. The bracket 102 is coupled to the pad 101 and may be bullhorn-shaped. In this way, the bracket 102 may include lateral wings along which sliding attachments for attachment to the combustor assembly 110 are disposed. Here, the sliding attachments maintain the support for the combustor assembly 110 during thermal expansion or contraction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A diffuser for a turbine engine, including an annular casing to seal compressor discharge air and struts attached to the casing to delimit an annular array of intra-strut regions, the diffuser comprising:
    a ring portion, including a ring shaped annular body with a forward face disposed on a forward facing side thereof and an aft face disposed on an aft facing side thereof, the forward and aft facing sides opposing one another and the ring portion being supportable by an integral connection between one or more of the struts and the aft face; and
    a splitter portion, including a ring shaped annular body with an aft face disposed on an aft side thereof to mate with the forward face of the ring portion body, the splitter portion further including:
    a lead edge, on a forward side of the splitter portion body, which is extendable into a flow path of the compressor discharge air to split the flow path into secondary flow paths defined radially outside of and inside of the splitter portion body.

2. The diffuser according to claim 1, wherein at least one of the ring portion and the splitter portion is formed of plural segments.

3. The diffuser according to claim 1, wherein the ring portion is integrally coupled to the struts.

4. The diffuser according to claim 1, wherein the splitter portion is coupled to the ring portion.

5. The diffuser according to claim 1, wherein the splitter portion is mechanically connected to the ring portion.

6. The diffuser according to claim 1, wherein the splitter portion comprises upper and lower portions.

7. The diffuser according to claim 6, further comprising mechanical connectors to conjoin the upper and lower portions.

8. The diffuser according to claim 1, further comprising a supporting assembly on which a combustor assembly is supportable.

9. The diffuser according to claim 8, wherein the supporting assembly is disposed on at least one of the ring portion and the splitter portion within an intra-strut region.

10. The diffuser according to claim 8, wherein the supporting assembly comprises a pad coupled to the at least one of the ring portion and the splitter portion.

11. The diffuser according to claim 1, wherein the lead edge comprises substantially smooth faces tapered toward one another in a radial direction.

12. A diffuser for a turbine engine, including an annular casing to seal compressor discharge air and struts attached to the casing to delimit an annular array of intra-strut regions, the diffuser comprising:
    a ring shaped annular body having an aft face at an aft facing side thereof, which is supportable by an integral connection between one or more of the struts and the aft face, the ring shaped annular body including:
    a lead edge, on a forward facing side thereof, which is opposed to the aft facing side and is extendable into a flow path of the compressor discharge air to split the flow path into secondary flow paths defined radially outside of and inside of the ring shaped annular body and the lead edge.

13. The diffuser according to claim 12, further comprising a supporting assembly, disposed on the ring shaped annular body within an intra-strut region, and on which a combustor assembly is supportable.

14. The diffuser according to claim 13, wherein the supporting assembly comprises a pad coupled to the ring shaped annular body.

15. A turbine engine comprising the diffuser of claim 13, a compressor to discharge the compressor discharge air and the combustor assembly, which is receptive of the compressor discharge air from the secondary flow paths, and which is supported on the supporting assembly.

16. The turbine engine according to claim 15, wherein the diffuser is plural in number.

17. A turbine engine comprising the diffuser of claim 12, a compressor to discharge the compressor discharge air and a combustor assembly, which is receptive of the compressor discharge air from the secondary flow paths.

18. The turbine engine according to claim 17, wherein the diffuser is plural in number, with the plural diffusers disposed in parallel with one another.

19. A diffuser for a turbine engine, including an annular casing to seal compressor discharge air and struts attached to the casing to delimit an annular array of intra-strut regions, the diffuser comprising:
- a ring shaped annular body having an aft face at an aft facing side thereof, supportable an integral connection between one or more of the struts and the aft face, and including a lead edge, on a forward facing side thereof, which is opposed to the aft facing side and is extendable into a flow path of the compressor discharge air to split the flow path into secondary flow paths defined radially outside of and inside of the ring shaped annular body and the lead edge; and
- a supporting assembly, disposed on the ring shaped annular body within an intra-strut region, and on which a combustor assembly is supportable.

20. The diffuser according to claim 19, wherein the supporting assembly comprises a pad coupled to the at least one of the ring portion and the splitter portion.

* * * * *